United States Patent
Rummler et al.

(10) Patent No.: US 9,442,635 B2
(45) Date of Patent: Sep. 13, 2016

(54) TESTING USER INTERFACE LAYOUT OR LANGUAGE COMPATIBILITY

(71) Applicants: Zeno Rummler, Stutensee (DE);
Marcel Kassner, Hockenheim (DE);
Ottmar Lutzy, Zweibruecken (DE);
Beatrice Pasch, Speyer (DE)

(72) Inventors: Zeno Rummler, Stutensee (DE);
Marcel Kassner, Hockenheim (DE);
Ottmar Lutzy, Zweibruecken (DE);
Beatrice Pasch, Speyer (DE)

(73) Assignee: SAP SE, Walldorf (DE)

( * ) Notice: Subject to any disclaimer, the term of this patent is extended or adjusted under 35 U.S.C. 154(b) by 756 days.

(21) Appl. No.: 13/730,113

(22) Filed: Dec. 28, 2012

(65) Prior Publication Data

US 2014/0189547 A1  Jul. 3, 2014

(51) Int. Cl.

| G06F 11/36 | (2006.01) |
| G06F 3/0484 | (2013.01) |
| G06F 9/445 | (2006.01) |
| H04W 4/00 | (2009.01) |
| H04W 52/02 | (2009.01) |
| G06F 9/44 | (2006.01) |
| H04L 29/08 | (2006.01) |

(52) U.S. Cl.
CPC .............. *G06F 3/0484* (2013.01); *G06F 8/38* (2013.01); *G06F 8/65* (2013.01); *H04W 4/001* (2013.01); *H04W 4/003* (2013.01); *H04W 52/0267* (2013.01); *G06F 11/368* (2013.01); *G06F 11/3692* (2013.01); *H04L 67/34* (2013.01); *Y02B 60/183* (2013.01); *Y02B 60/50* (2013.01)

(58) Field of Classification Search
None
See application file for complete search history.

(56) References Cited

U.S. PATENT DOCUMENTS

| 7,096,464 | B1 | 8/2006 | Weinmann | |
| 7,620,392 | B1 | 11/2009 | Maurya et al. | |
| 2005/0188357 | A1* | 8/2005 | Derks et al. | 717/124 |
| 2007/0006043 | A1* | 1/2007 | Pins | 714/38 |
| 2008/0276225 | A1 | 11/2008 | Saterdag et al. | |
| 2008/0310736 | A1* | 12/2008 | Chattopadhyay et al. | 382/218 |
| 2009/0217309 | A1* | 8/2009 | Grechanik et al. | 719/328 |
| 2010/0057433 | A1* | 3/2010 | Jackson | G06F 17/28 704/3 |
| 2011/0035739 | A1 | 2/2011 | Harada | |
| 2011/0144972 | A1* | 6/2011 | Koenig | G06F 9/4448 704/2 |
| 2012/0023484 | A1 | 1/2012 | Demant et al. | |
| 2012/0109869 | A1* | 5/2012 | Sahibzada et al. | 706/47 |

OTHER PUBLICATIONS

Extended European Search Report for Application No. EP 13198576.4, dated Apr. 11, 2014, 4 pages.
'Regression testing' [online] Wikipedia, 2011 [retrieved on Dec. 28, 2012]. Retrieved from the Internet: <URL: http://en.wikipedia.org/w/index.php?title=Regression_testing&oldid=460786825>, 3 pages.

(Continued)

*Primary Examiner* — Matt Kim
*Assistant Examiner* — Daniel Samwel
(74) *Attorney, Agent, or Firm* — Fish & Richardson P.C.

(57) ABSTRACT

A computer-implemented method for testing a user interface includes: receiving, in a computer system, a first manual check result from a first manual check of a user interface of an application; generating a first markup-language record from the user interface and associating the first markup-language record with the first manual check result; after one or more changes are made in the application, generating a second markup-language record from the user interface; performing, in the computer system, at least one test on the user interface that involves a comparison of the first markup-language record with the second markup-language record; and performing, in the computer system, an action based on a result from the performed at least one test.

14 Claims, 14 Drawing Sheets

(56) References Cited

OTHER PUBLICATIONS

'Introduction—Selenium Documentation' [online]. Selenium HQ, 2008-2012, [retrieved on Dec. 28, 2012]. Retrieved from the Internet: <URL: Seleniumhq.org/docs/01_introducing_selenium.html#selenium-s-aka-selenium-webdriver>, 7 pages.

'SAP Automation GUI Interfaces' [online]. SAP, [retrieved on Dec. 28, 2012]. Retrieved from the Internet: <URL: Help.sap.com/saphelp_45b/helpdata/de/6b/093cc4638f11d2804b00c04fada2a1/content.htm>, 2 pages.

* cited by examiner

FIG. 1A

Purchase Order: 3962
Complete Purchase Order

| Order | Save | Close | Preview | New▾ | Check | Record UI |

Buyer Responsible: *    MC0678 - Peter Greene
Bill-To: *              MC21100 - Accounts

Add Items from Catalog
To select a product from a catalog, in the drop-down list choose a catalog a Technical Test Catalog ▾    Start

Items

| Add Row | Copy | Remove | Assign Source of Supply |

| Number | Item Type | Process Type | Product ID | Product D |
|--------|-----------|--------------|------------|-----------|
| 1 | Material ▾ | Non Stock ▾ | | |

```xml
<?xml version="1.0"?>
<Collections xmlns="http://.../collectors">                                    ←200
  <Logging xmlns="">
202   <LogRecords></LogRecords>
  </Logging>
  - <DynamicUIModel xmlns="">
    - <ComponentControllers>
204   - <ComponentController componentId="....QA.uicomponent">
206     -<ComponentModel>
210       - <UXComponent xmlns="http://...uxcomponent-1.0"
            stickyNotesBinding="/Root/Interactor1_KK" StickyNotesDisabled="false"
            modelVersion="1.0" designtimeVersion=" 45.0.1356.1338" helpId="44919731-da1a-42ba-9dd1
            -782a80c7d3d5" AuthorizationClassificationCode="Application" csnComponent="..."
            name="..." id="-1" xmlns:xsd="http://www.w3.org/2001/XMLSchema"
            xmlns:xsi="http://www.w3.org/2001/XMLSchema-instance">
            - <Implementation xmlns="http://...uxcontroller-1.0" id="84957211597571 05785">
214         - <DataModel name="Root" id="111" designtimeMainBOEsrNamespace="http://..."
              designtimeMainBOProxyName="CONTROLLER">
                <Bind id="spqvVzsRuKc3tZuA4f9Ef0" esrNamespace="http://..."
                  field="Root" proxyName="CONTROLLER"/>
              - <Structure name="Interactor1_KK" id="KK_STRUCT">
                  <Bind id="$dRri3BG6KEJxhE82jiqBm" esrNamespace="http://..."
                    field="Root" proxyName="CONTROLLER"/>
                - <DataField name="PartyID_ZSK" id= "ZSKID" gdtProxyType="..."
                  cctsType="identifier" type="string">
                    <Bind id="2Ng5fmmci424Dbj5DJUnd0" esrNamespace="http://..."
                      field="-~SellerPartyID-~PartyID-~content"
                      proxyName="CONTROLLER"/>
                </DataField>
                - <DataField name="PartyID_AHWV" id="AHWVID" gdtProxyType="..."
                  cctsType="identifier" type="string">
                    <Bind id="AHWVID0" esrNamespace="http://..." field="-
                      ~ResponsiblePurchasingUnitID-~PartyID-~content"
                      proxyName="CONTROLLER"/>
                </DataField>
                - <DataField name="PartyID_AGWZ" id= "AGWZID" gdtProxyType="..."
                  cctsType="identifier" type="string">
                    <Bind id="AGWZID0" esrNamespace="http://..." field="-
                      ~EmployeeResponsibleID-~PartyID-~content"
                      proxyName="CONTROLLER"/>
```

FIG. 2A

```
</DataField>
- <DataField name="EmployeeResponsibleName_EZT" id="EZTID"
  gdtProxyType="..." cctsType="name" type="string"
  lockBehavior="ReadOnly">
      <Bind id="EZTID0" esrNamespace="http://..." field="-
      ~EmployeeResponsibleName"
      proxyName="CONTROLLER"/>
  </DataField>
- <DataField name="PartyID_LH" id="LHID" gdtProxyType="..."
  cctsType="identifier" type="string">
      <Bind id="LHID0" esrNamespace="http://..." field="-~CompanyID
      ~PartyID~content" proxyName="CONTROLLER"/>
  </DataField>
- <DataField name="SellerPartyName"
  id="n9xRFQHfXaMNqVe0vfbG3W" gdtProxyType="..."
  cctsType="name" type="string" lockBehavior="ReadOnly">
      <Bind id="VX_IYUYHsKUkISkpEbyr8W"
      esrNamespace="http://..." field="-~SellerPartyName"
      proxyName="CONTROLLER"/>
  </DataField>
- <DataField name="SellerPartyUUID"
  id="6ruiSqBIAKINwut1vWGAVG" gdtProxyType="APC_V_UUID"
  cctsType="identifier" type="string" lockBehavior="ReadOnly"
  xsdPattern="[0-9a-fA-F]{8}-[0-9a-fA-F]{4}-[0-9a-fA-F]{4}-[0-9a-fA-F]{4}
  -[0-9a-fA-F]{12}">
      <Bind id="JDYQatPcKqQDjLZPjRqJQG"
      esrNamespace="http://..." field="-~SellerPartyUUID~content"
      proxyName="CONTROLLER"/>
  </DataField>
- <DataField name="PreventDocumentOutputIndicator"
  id="kZW2Wq72WqERL2IsLKzJS0" gdtProxyType="..."
  cctsType="indicator" type="boolean">
      <Bind id="gQ2zAnUzXqcXceV2IIxU10" esrNamespace="http://..."
      field="-~PreventDocumentOutputIndicator"
      proxyName="CONTROLLER"/>
  </DataField>
  </Structure>
- <List name="Interactor2_CAT" id="CAT_L" defaultLeadSelection="true">
      <Bind id="CAT_L_0" esrNamespace="http://..." field="Root-.Item"
      proxyName="CONTROLLER"/>
```

FIG. 2B

```xml
        </List>
          <Structure name="DynamicExpression"
            id="DynamicExpression_STRUCT"> </Structure>
          <BOVersion id="kyqtuEc_u4AbORIQUe562W"
             invalidationHash="16083E48FAD5A1EA36E5AB3648E0818080F55D6A"
             boNS="http://..." boName="CONTROLLER"/>
        </DataModel>
          <EventHandlers id="1999806778818546618"> </EventHandlers>
      </Implementation>
        <IdentificationRegion></IdentificationRegion>
216— </ContextualNavigationRegion xmlns="http://...uxview-1.0" id="AK1">
      - <FunctionBar id="AK2">
          - <ButtonGroup name ="ActionButtons" id="actionButtonGrp_AK">
              - <Button name="HS" id="HS" style="Standard"
                  onClick="OrderHS_HS">
         222A      <Enabled id="HS2"></Enabled>
                  <ToolTip id="AIFT48f$e4gTrcYdySXubm"
                    textPoolId="yw2Xf0eqcakDBNvP7Wynvm"/>
     222          <Explanation id="3CUJBGtuWaoueuassQ$TIW"
                    textPoolId="NWIfPIA7fKcw6RFx8Vteom"/>
                  <Text id="3570111231594079427" textPoolId="HW"  —222B
                    fallbackValueType="string" fallbackValue="Order"/>
              </Button>
              - <Button name="Button" id="w2kS4gsfU4gflRA1N0vv$0"
                  style="Standard" onClick="SaveHR_HR">
                  <Enabled id="hmGC3LIFnK6eLwGe9rE3C0"/>
                  <Visible id="rRD55PM7AKgjvN1VNBDwc0"/>
                  <Explanation id="HeBMijYPXKozS3zrWTezsG"
                    textPoolId="m6jXLflXpaoUXsJxSXVVNW"/>
                  <Text id="7e2McFtcl4ENDLfvf$JHdm"
                    textPoolId="kkK$hczFZal6w8PGQa8_BG"/>
              </Button>
              - <Button name="HR" id="HR" style="Standard"
                  onClick="SaveHR_HR">
                  <Enabled id="HR2"/>
                  <Visible id="qNhOoB2A34gveJ5I2CGYIW"/>
                  <Text id="3449705074255060532" textPoolId="HV"
                    fallbackValueType="string" fallbackValue="Save"/>
```

FIG. 2C

```xml
        </Button>
      - </Button name="HT" id="HT" style="Cancel" onClick="CloseHT_HT">
            <Text id="30543616996093300411" textPoolId="HX"
                fallbackValueType="String" fallbackValue="Close"/>
        </Button>
      </ButtonGroup>
        </ButtonGroup name="StandardButtons" id="24446162100777707701">
      </ButtonGroup>
    </FunctionBar>
  </ContextualNavigationRegion>
218— <ViewContainerRegion xmlns="http://...uxview-1.0" id="JN">
  - <View id="JN1" navigationItemId="ViewJN" rows="3" columns="2">
        <PrimaryHelpExplanation id="JN2" fallback Value=""/>
    - <PaneContainer id="JN0PANE" rowSpan="1" colSpan="2" row="0"
      column="0">
      - <FromPane id="KK" isCollapsible="true">
            <PrimaryHelpExplanation id="8vdFlwM_D4clrWf6h9F1DG"
                textPoolId="D3W8sjr3zKQgnmEOqXwg7m"/>
        - <SectionGroup id="MP" rowSpan="1" colSpan="1" row="0"
          column="0" showGroupName="true">
              <SectionGroupName id="MP_1" textPoolId="MQ"/>
            - <SectionGroupItem id="ZSK" rowSpan="1" colSpan="1"
              forceNewLine="false">          224B
224A            <Label id="ZSK66" textPoolId="8224143799756723147"
                    fallbackValue="Supplier"/>
                <ObjectValueSelector name="ZSK_ED" id="ZSK6"
                    cctsType="identifier"
                    onClick="EH_SupplierRootOpen"/>
            </SectionGroupItem>
            - <SectionGroupItem id="LH" rowSpan="1" colSpan="1"
              forceNewLine="false">
                <Label id="LH66" textPoolId="2708084013376885975"
                    fallbackValue="Company"/>
                <ObjectValueSelector name="CompanyIDPartyID_DL"
                    id="LH6" cctsType="identifier"
                    onClick="EH_CompanyRootOpen"/>
            </SectionGroupItem>
        </SectionGroup>
          </SectionGroup id="MS" rowSpan="1" colSpan="1" row="0"
            Column="1" showGroupName="true"
            forceNewLine="false"></SectionGroup>
```

FIG. 2D

```
            </FormPane>
          </PaneContainer>
        - <PaneContainer id="esMHHCH2fKoaG296N6EOi0" colSpan="2" row="1"
          column="0">
              <EmbedComponentPane id="GigCnVNaLaMilQhoe$x4i0"
                 isCollapsible="true" embedName="OciOpiPlugin_EC1"/>
          </PaneContainer>
        </View>
          <View id="VIEW_00" rows="2" columns="2"/>
      </ViewContainerRegion>
220— <TextPool>
      - <TextBlock language="EN" xmlns="http://...base-1.0" currentLanguage="true"
        masterLanguage="true">
            <TextPoolEntry id="HO_EN" textCategory="XBUT" text="You Can Also"
              textUuid="HO"/>
            <TextPoolEntry id="IA_EN" textCategory="XMIT" text="Edit Output
              Settings (Order)" textUuid="IA"/>
            <TextPoolEntry id="IE_EN" textCategory="XBUT" text="View All"
              textUuid="IE"/>                                    ┌226
      220A { <TextPoolEntry id="HW_EN" textCategory="XBUT" text="Order"
              textUuid="HW"/>
            <TextPoolEntry id="HV_EN" textCategory="XBUT" text="Save"
              textUuid="HV"/>
      220B { <TextPoolEntry id="8224143799756723147_EN" textCategory="XFLD"
              text="Supplier" textUuid="8224143799756723147"
              esrTextCategory="XFLD" esrTextId="GEN_BYD_006704"/>
         228 <TextPoolEntry id="4007961525348571383_EN" textCategory="XFLD"
              text="Purchasing Unit" textUuid="4007961525348571383"
              esrTextCategory="XFLD" esrTextId="GEN_BYD_007277"/>
        </TextBlock>
      </TextPool>
    </UXComponent>
  </ComponentModel>
212— <DataContainer>
      <Record name="Root"></Record>
    </DataContainer>
  </ComponentController>
    <ChildComponentControllers></ChildComponentControllers>—208
 </ComponentControllers>
</DynamicUIModel>
</Collections>                                         FIG. 2E
```

TESTING USER INTERFACE LAYOUT OR LANGUAGE COMPATIBILITY

BACKGROUND

Computer applications and other programs are sometimes developed in processes that extend over periods of time. For example, after the software has been designed, a development phase can be started in which one or more developers write or otherwise generate and assemble code that will ultimately form the application. In some situations, the development phase can end at a predefined time, and thereafter the application can be revised in one or more ways during a revision phase. For example, errors that have been found in the developed application can be corrected, or other adjustments can be made.

One important characteristic of user interfaces is its layout and that it contains the correct user interface (UI) elements in that layout. For example, changes made during the revision phase can inadvertently cause the layout to change and/or one or more UI elements to be removed from the UI of the application.

Another important characteristic of UIs is that the language of UI elements is correctly matched with the particular situation. For example, the application can be intended for multiple national markets and the UI can therefore be provided with different texts for the UI elements depending on the relevant country, such as English, German, or French texts.

SUMMARY

In a first aspect, a computer-implemented method for testing a user interface includes: receiving, in a computer system, a first manual check result from a first manual check of a user interface of an application; generating a first markup-language record from the user interface and associating the first markup-language record with the first manual check result; after one or more changes are made in the application, generating a second markup-language record from the user interface; performing, in the computer system, at least one test on the user interface that involves a comparison of the first markup-language record with the second markup-language record; and performing, in the computer system, an action based on a result from the performed at least one test.

In a second aspect, a computer program product embodied in a non-transitory computer-readable storage medium includes instructions that when executed by a processor perform a method for testing a user interface. The method includes: receiving, in a computer system, a first manual check result from a first manual check of a user interface of an application; generating a first markup-language record from the user interface and associating the first markup-language record with the first manual check result; after one or more changes are made in the application, generating a second markup-language record from the user interface; performing, in the computer system, at least one test on the user interface that involves a comparison of the first markup-language record with the second markup-language record; and performing, in the computer system, an action based on a result from the performed at least one test.

In a third aspect, a system includes: one or more processors; and a computer program product embodied in a non-transitory computer-readable storage medium and including instructions that when executed by a processor perform a method for testing a user interface. The method includes: receiving, in a computer system, a first manual check result from a first manual check of a user interface of an application; generating a first markup-language record from the user interface and associating the first markup-language record with the first manual check result; after one or more changes are made in the application, generating a second markup-language record from the user interface; performing, in the computer system, at least one test on the user interface that involves a comparison of the first markup-language record with the second markup-language record; and performing, in the computer system, an action based on a result from the performed at least one test.

Implementations can include any or all of the following features. When the user interface passes the test, the method further includes associating the second markup-language record with the first manual check result; and when the user interface does not pass the test; the method further includes causing a second manual check of the user interface to be performed. The test includes a layout check and the user interface passes the layout check if a first layout reflected by the first markup-language record corresponds to a second layout reflected by the second markup-language record. The test includes a language acceptance test and the method further includes: detecting, before generating the second markup-language record, that a user logs in using a different human language than used for the user interface when the first markup-language record was generated; and determining whether at least one user-interface element text in the first markup-language record has not been properly translated to the second markup-language record. The user interface fails the language acceptance test when (i) the user-interface element text in the first markup-language record is identical to a corresponding user-interface element text in the second markup-language record, and (ii) the user-interface element text is not on an exceptions list. The user interface fails the language acceptance test when the user-interface element text in the first markup-language record has no corresponding user-interface element text in the second markup-language record. The method further includes receiving a user input that selects at least one of multiple aspects for the test, wherein the test comprises the selected at least one aspect based on the received user input.

Implementations can provide any or all of the following advantages. UI development can be improved. Checking of a UI under development can be made more effective. The need for manual checking to determine whether a UI layout has been changed by revisions can be reduced or eliminated. The need for manual checking to determine whether UI language acceptance issues have been raised by revisions can be reduced or eliminated.

The details of one or more implementations are set forth in the accompanying drawings and the description below. Other features and advantages will be apparent from the description and drawings, and from the claims.

DESCRIPTION OF DRAWINGS

FIGS. 1A-F show examples of a UI being tested.
FIGS. 2A-E show an example of a markup-language record.

DETAILED DESCRIPTION

Figure 1B:
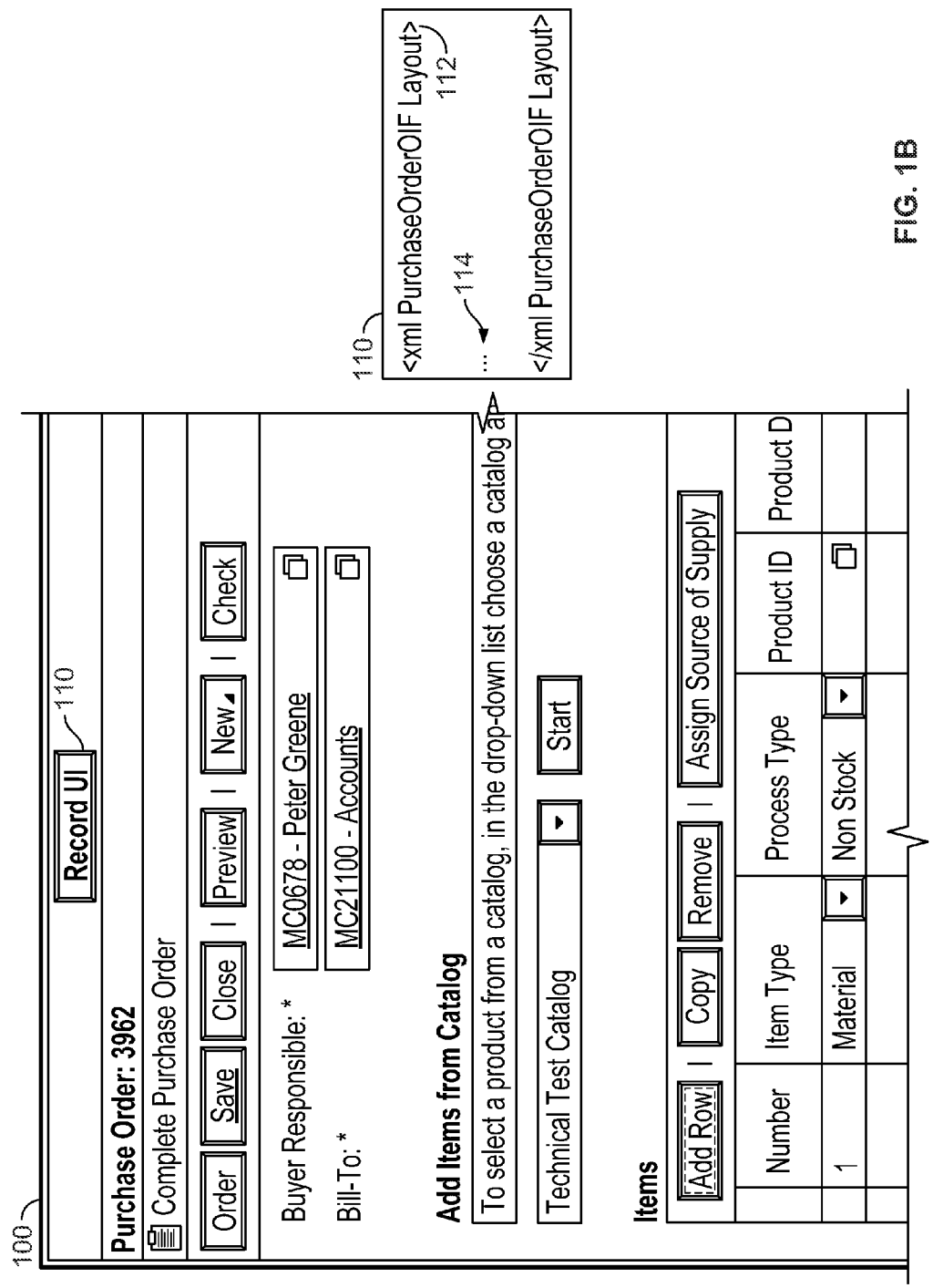

This document describes systems and techniques for processing a UI, before and after revisions are made to the corresponding application, to determine whether the revisions raise any UI issues. For example, it can be determined whether the revision inadvertently has changed the layout of the UI, and if so appropriate correction can be performed. As another example, it can be determined whether a translation was completely and correctly done, or whether the revision inadvertently has caused a translation into another language (e.g., from English to German) to be incorrect or incomplete.

FIGS. 1A-F show examples of a UI 100 being tested. Beginning with FIG. 1A, the UI 100 as illustrated there can be generated by an application, e.g., an application that is part of an enterprise resource planning (ERP) system 102. For example, the ERP system can include a Business ByDesign solution available from SAP AG.

In the illustrated example, the UI 100 relates to a purchase order. In some implementations, a user can launch the corresponding application (e.g., a purchasing application) and open up a purchase order record in the application, which causes certain fields, control and information to be presented in the UI. For example, this can be done for purposes of testing the application, including its UI.

The UI 100 is here shown only in part for clarity. The UI includes an element 104 labeled "order" and an element 106 labeled "check", among other features. For example, each of the order and check elements can include a UI input control, such as a button. In some implementations, each element in the UI 100 is uniquely identified (e.g., by a specific ID) and also with corresponding text content that is to be presented to the user. For example, "order" and "text," respectively, would be included in such text content for these two elements.

The development of the application program of the UI 100 can proceed essentially as follows. The coding of the application is done during a development phase, which has a defined point in time when the development closes. After that time, the application should ideally not be revised any further, or if necessary, only corrections, fixes or other minor adjustments should be made after the close of development. After any such modifications are done, if the application is then approved it can be prepared for its intended use, such as for shipment to customers.

One or more persons (e.g., a developer or someone responsible for application design) can manually check the UI 100. Such manual checking can relate to the layout of the UI 100. For example, the spatial organization of the UI elements can be verified.

Such manual checking can also or instead relate to language and/or translation. Generally, a UI is checked in the desired translated language against the original language of the UI. For a case where a supposedly translated word or phrase is equal to the original, this occurrence is flagged for manual checking of the translation.

In some implementations, a so-called language acceptance test can be performed by a person who visually (or by audio, etc.) inspects the UI. For example, the person can log into the system 102 with a particular language (e.g., as a German-speaking user) and verify that the UI elements contain German text in all applicable places and that no other language (e.g., English) occurs. In some implementations, the logon can automatically occur with a particular language. If errors or discrepancies are discovered they can be flagged to the appropriate person or team. The result of such a manual check can be recorded in the system 102. For example, the manual check result can indicate that as of the date of the test, the current version of the application has the correct (i.e., the intended) layout. Also, or instead, such a manual check result can indicate that as of the date of the test, the current version of the application passes the language acceptance test.

If the application passes the manual checking, then the UI 100 in its current form can be recorded. In some implementations, the system 102 can present a control 108. For example, the control 108 can cause the UI 100 to be recorded using a markup language, such as in an extensible markup language (XML) file. Such a record can reflect the layout and other characteristics of the UI as of the recordation moment, and can later be used for one or more purposes. In some implementations, the recordation can be done automatically and without being triggered by a separate user input, for example in response to the user indicating that the application passes the applicable test(s).

FIG. 1B shows the UI 100 and an XML record 110 that is associated with the UI. For example, the XML record is generated after the UI 100 is manually checked and found to pass one or more tests (e.g., a layout test and/or a language acceptance test.) Here, the XML record 110 includes start and end tags 112 that define the markup-language contents corresponding to the UI 100 (as opposed to, say, markup-language contents that may correspond to another UI or to a testing of the UI 100 performed at some other time.) An ellipsis 114 schematically illustrates that the XML record 110 includes content corresponding to the UI 100, but that such content is not explicitly shown here for simplicity. For example, such content can specify the UI 100 in terms of its UI elements, the layout of the UI elements, and the text to be displayed for each of the UI elements. That is, the XML record 110 documents the UI 100 in its current version at the time that the manual checking (e.g., for language acceptance) was performed.

As noted above, however, it happens that the application is modified in some regard after it has been found compliant according to one or more tests. For example, one or more corrections or other modifications can be done, also after a development phase has officially concluded. In such situations, another markup-language record can be generated based on the revised application, and can be used in ascertaining whether the previously performed test(s) might need to be repeated.

Figure 1C:
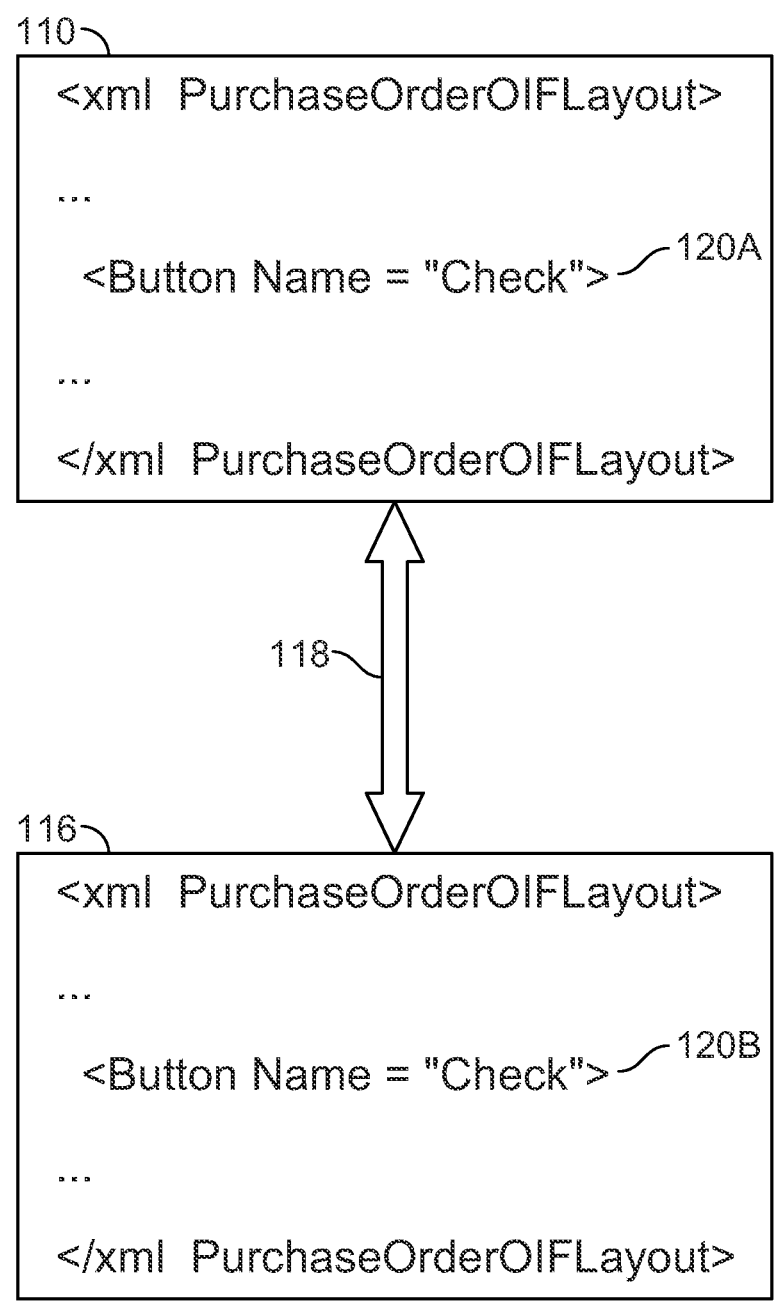

FIG. 1C shows a new XML record 116 that has been generated. This is done some time after the XML record 110 was created, and the application may have undergone one or more revisions in the meantime. The new XML record 116 can be generated as part of an automatic determination whether another manual check of the UI is necessary after the revision, or whether the previous manual check remains valid.

For this or other purposes, a comparison 118 is performed between the original and new XML records. In some implementations, the layout of the UI as reflected in the new XML record can be determined, it can be determined which UI elements are part of the UI according to the new XML record, and/or the associated text for one or more of the UI elements in the new XML record can be determined. Based on one or more portions of information, the comparison 118 can then be performed to assess the change, if any, in the UI since the last manual check. For example, if the original XML record 110 includes a UI element 120A corresponding to a button, then it can be determined whether the new XML record 116 includes a UI element 120B corresponding to the same button.

If the UI passes the test according to the comparison 118, the new XML record 116 can be associated with the manual check result that was previously obtained. In some implementations, the test can include a layout check and the UI passes this test if a layout reflected by the XML record 110 corresponds to a layout reflected by the new XML record 116. For example, the UI might pass the test because the new XML record 116 includes the UI element 120B (assuming that no other discrepancies are detected.) That is, generating an association between the previous check results and the XML record shows that the previous manual check remains valid for this UI. Accordingly, the association indicates that there is no need to repeat the manual checking for this UI despite the intervening revisions of the application code.

Figure 1D:
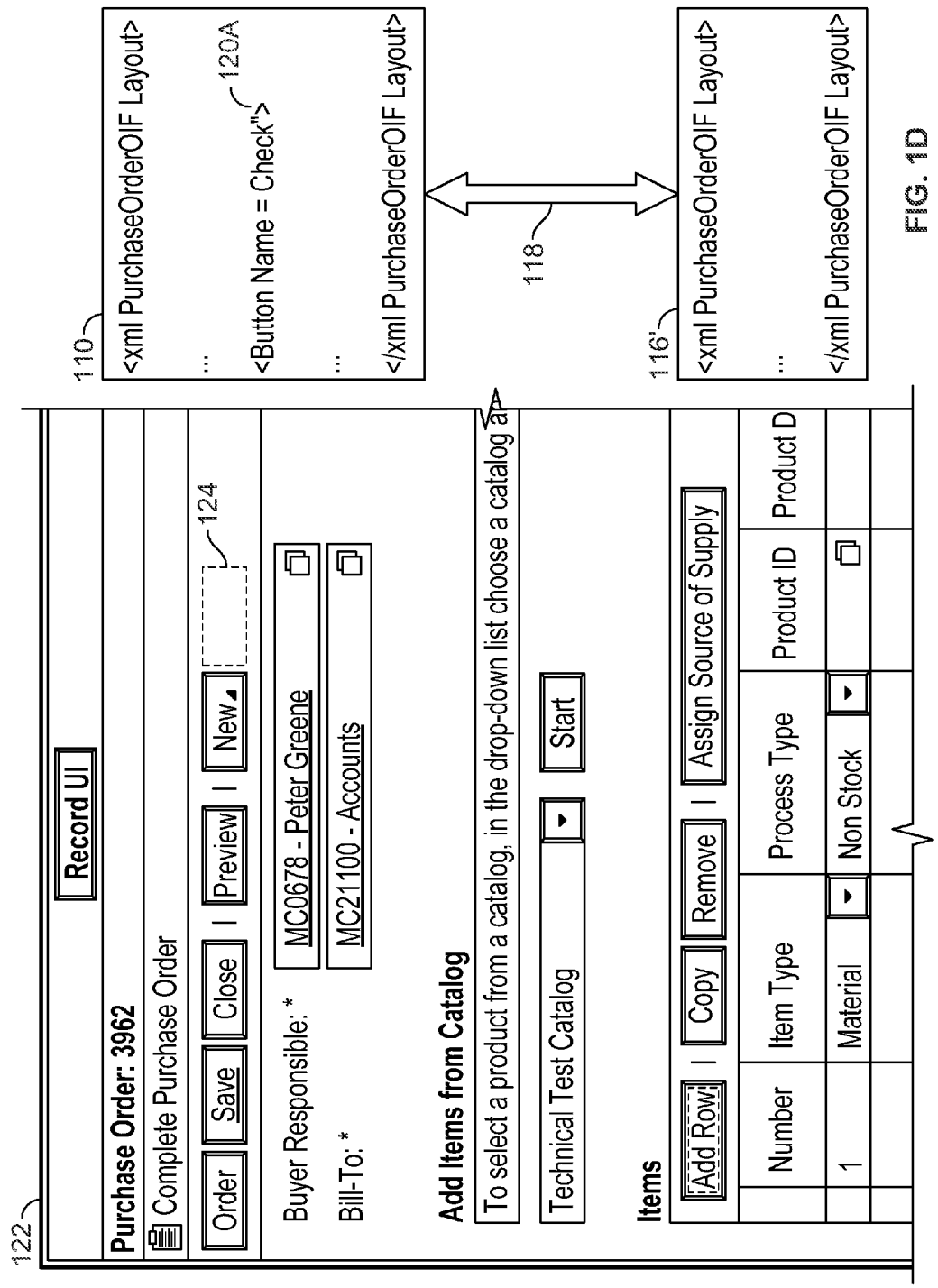

FIG. 1D shows an example where the UI does not pass one or more tests after revision of the application. Particularly, after such revisions, the application generates a UI 122 that is similar to the UI 100 (FIGS. 1A-B) in some regards, but which lacks the "check" button, as indicated by an empty area 124. This is reflected in a new XML record 116', wherein the entry for the UI element 120B (FIG. 1C) is not present. Accordingly, in such situation the UI can be said to not pass the test that is based on the comparison 118 between the original XML record 110 and the new XML record 116.

If the UI does not pass the test according to the comparison 118, one or more actions can be triggered. In some implementations, at least one additional manual check of the UI can be performed. For example, such manual check can reveal: what changes in the UI layout the revisions have caused, the number or types of included UI elements that may have appeared or disappeared since the last version, and/or how the texts associated with one or more UI elements have changed in the new version. As a result of the manual check, the application can be modified so that the UI is corrected.

In some implementations, the test includes at least one language acceptance test. For example, the UI can be intended for use in different geographical markets and different versions can then be generated wherein the UI elements should instead have corresponding texts in another language. However, such language-specific modifications can be disrupted when the application is revised. A testing can therefore be performed, for example as follows.

Assume that the application and its corresponding texts for UI elements are first created in a first language, say English, and that another version of the UI should be used in a market associated with a second language, say German. A user can then, for purposes of the check, log into the system (e.g., the system 102 in FIG. 1) as a German-speaking user. The system should then generate a UI for the application where the texts of the UI elements are in German instead of English. That is, a new XML record should be generated for the German UI and then compared with the original XML record generated for the English UI.

If any element text of the English UI is not properly translated, this would be noticeable to a human inspecting the German UI. However, such discrepancy can be detected also without human inspection, because it is reflected in the comparison between the respective XML records.

Figure 1E:
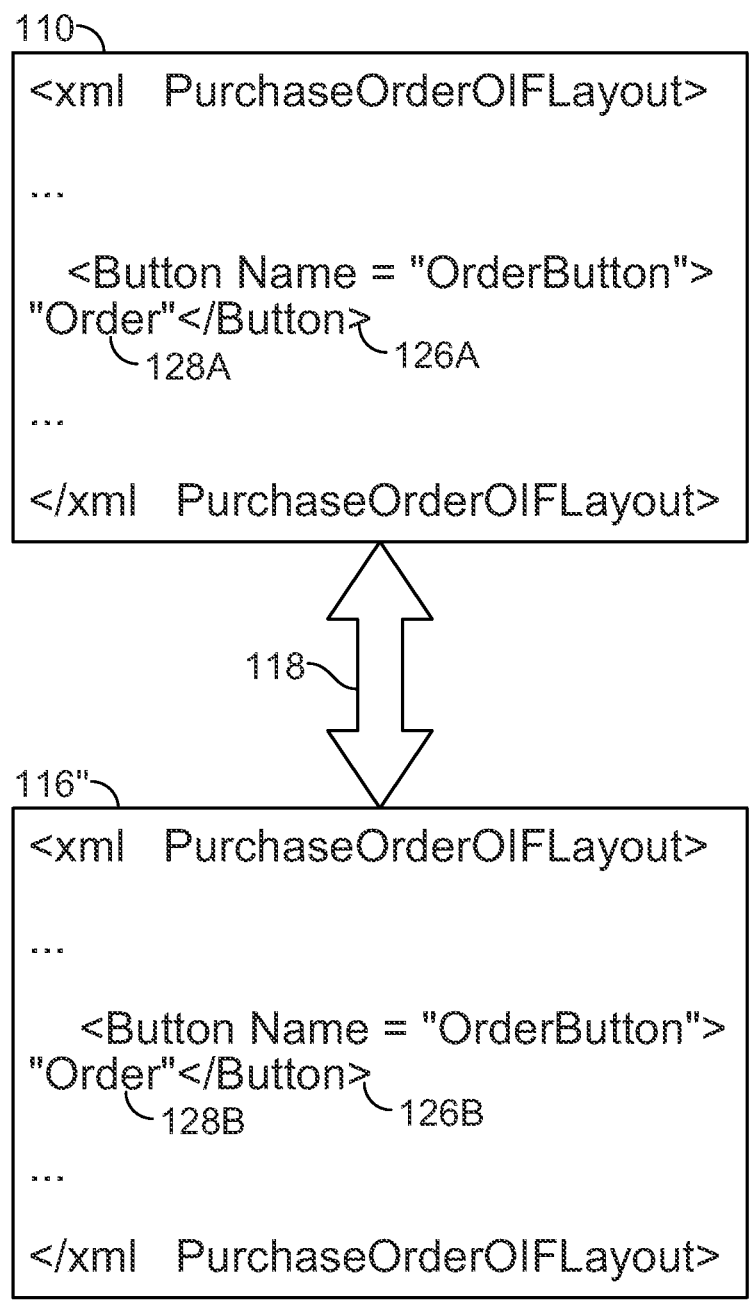

FIG. 1E shows an example where the word "order" for a UI element is inadvertently not translated and where the German UI would therefore contain a mistake that should be corrected. Here, the original XML record 110 generated from the English UI includes an entry 126A for a UI element that corresponds to an order button, and the entry therefore contains (or refers to) a word 128A which in this example is "order." A new XML record 116'' that was generated for the German UI (e.g., as presented after a person logged in as a German user) contains a corresponding entry 126B that also corresponds to an order button. However, the text for the entry 126B is here the word 126B which in this example reads "order," just as the word 128A did in the XML record for the English UI. Because the word 128A should have been translated, but the word 128B is identical thereto, the comparison 118 can result in an error (i.e., the German UI does not pass the test.) In some implementations, an exceptions list can be created that contains words that are identical in two or more languages, and for which the occurrence of the same word in the translated version does not necessarily indicate an error. For example, the word "Start" occurs both in German and English. That is, it can be determined, by word comparison and optionally using an exceptions list, whether at least one UI element text in the original XML record 110 has not been properly translated to the new XML record 116''. An appropriate corrective action—e.g., proper translation by a human—can then be triggered.

Figure 1F:
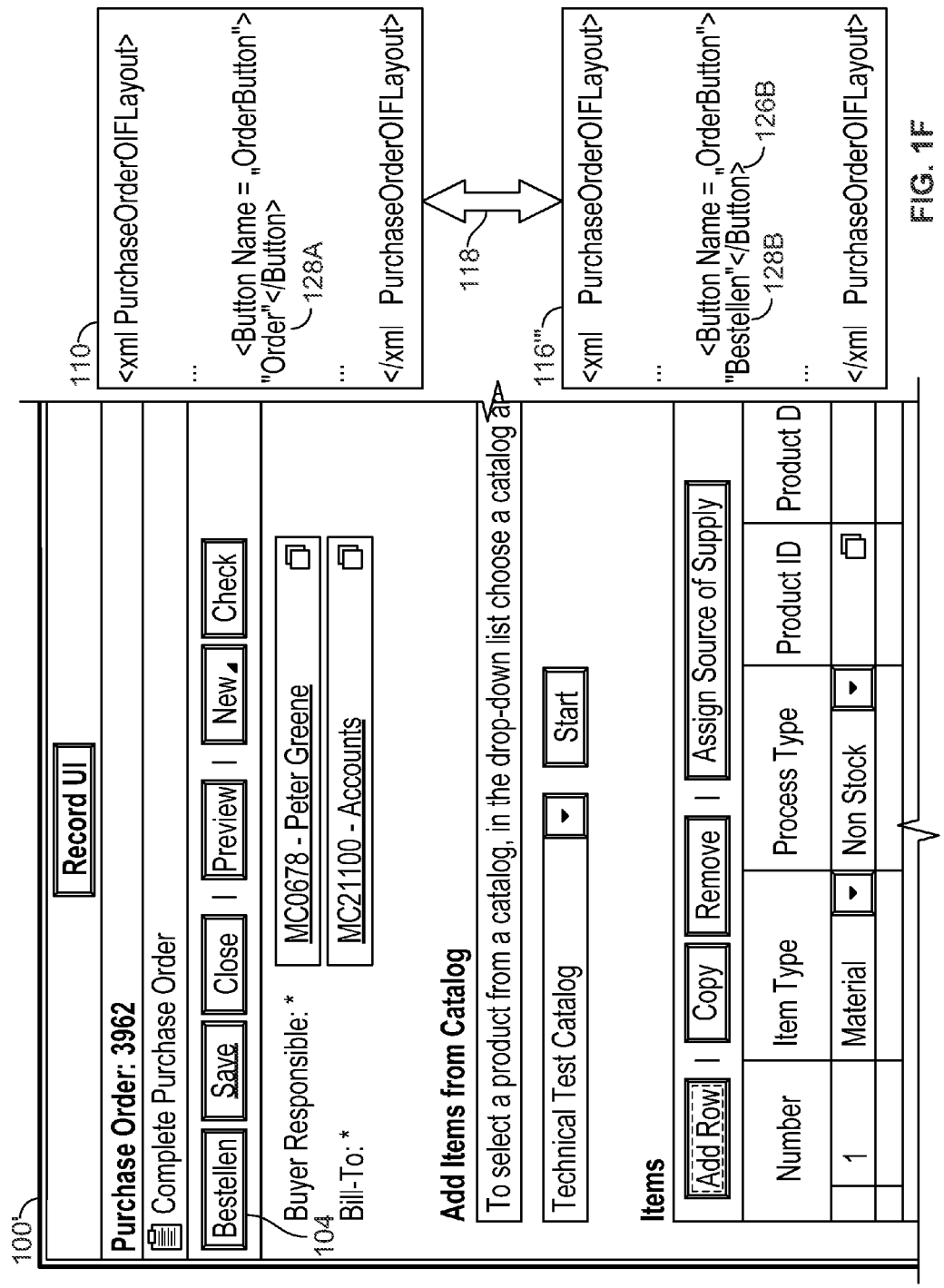

FIG. 1F shows an example where a translated word occurs by mistake. Here, a UI 100' has been generated that is similar to the UI 100 (FIG. 1A-B) in most regards, except that the German word "Bestellen" appears for the UI element 104. That is, a new XML record 116''' generated for the UI 100' contains the entry 126B, as expected, but the word 128B now reads "Bestellen," instead of "Order" as it should have, given that the UI 100' is for English-speaking users. That is, upon performing the comparison 118 it can be determined that the word 128B is not the same as the word 128A, and this indicates an error in the user interface, since both words refer to the same UI element (i.e., the order button) and should have the same language in this example. Accordingly, this issue can be flagged and appropriate action (e.g., reverting to "Order") can be taken.

Other situations can cause the UI to fail the language acceptance test. In some implementations, if text for a UI element is missing in the new XML record compared to the original XML record, this can be detected. For example, if the text is initial, whereby nothing will be displayed, this can be considered an error that should be corrected.

FIGS. 2A-E show an example of a markup-language record 200. In this example, the record 200 includes XML code that reflects a UI generated by an application. The record 200 can be analogous to any of the XML records mentioned above. For example, the generated UI can be processed and entries can be generated in the record 200 that reflect the layout, UI elements and/or UI element text of that UI.

At a high level, the record 200 includes a collections record 202 that contains information corresponding to the UI that was recorded. For example, the collections record can include logging information including, but not limited to, one or more log records.

The record 200 includes a dynamic UI model 204 that includes one or more sections of information reflecting the processed UI. For example, a component controller section 206 indicates that at least one component controller is present in the UI. Each component controller is uniquely identified, in some implementations by an identifier. For example, in cases involving SAP UI Automation center, each element can have a unique ID. In some implementations, including but not limited to the SAP UI Automation center, an xpath expression can identify the corresponding UI element.

In some implementations, a section 208 can indicate one or more child component controllers associated with the component controller(s).

The record 200 (e.g., the collections record 202) can include one or more component models, as indicated by an entry 210, and one or more data containers, as indicated by an entry 212. Moreover, the record 200 can include an implementation section 214, a contextual-navigation region 216, a view container region 218, and a text pool region 220. In short, the text pool region can include text (or other information) that is associated with one or more entries elsewhere in the record, such as a button or other UI element.

Here, the contextual-navigation region 216 includes an entry 222 that corresponds to an order button in the UI. For example, this can be analogous to the element 104 in FIG. 1A or 1F. An entry 222A indicates that the name of this UI element is "HS." Moreover, an entry 222B indicates that "HW" is the text pool ID for this UI element. That is, the text to be displayed with the order button UI element is not found directly in the entry 222 but rather in the text pool region 220. Accordingly, the text pool region includes an entry 220A that is identified using the entry 222B. In this example, the text pool ID in the text pool region 220 is "HW_EN," where the modifier "EN" indicates that this text corresponds to the English-language version of the UI. Particularly, a component 226 in the entry 220A specifies that the text for the order button is "Order." For example, another scan over the XML record can be performed to find the correct text for the element.

The contextual-navigation region 216 also includes an entry 224 that corresponds to a "Supplier" field in the UI. For example, in a UI relating to a purchase order there will be displayed, such as based on an input by the user, the name of a supplier involved in the transaction. An entry 224A indicates that the ID for this UI element is "ZSK." Moreover, an entry 224B indicates that "82241437997567231427" is the text pool ID for this UI element, and the text pool region accordingly includes an entry 220B that is identified using the entry 224B. Particularly, a component 228 in the entry 220B specifies that the text for the supplier UI element is "Supplier."

Figure 3:
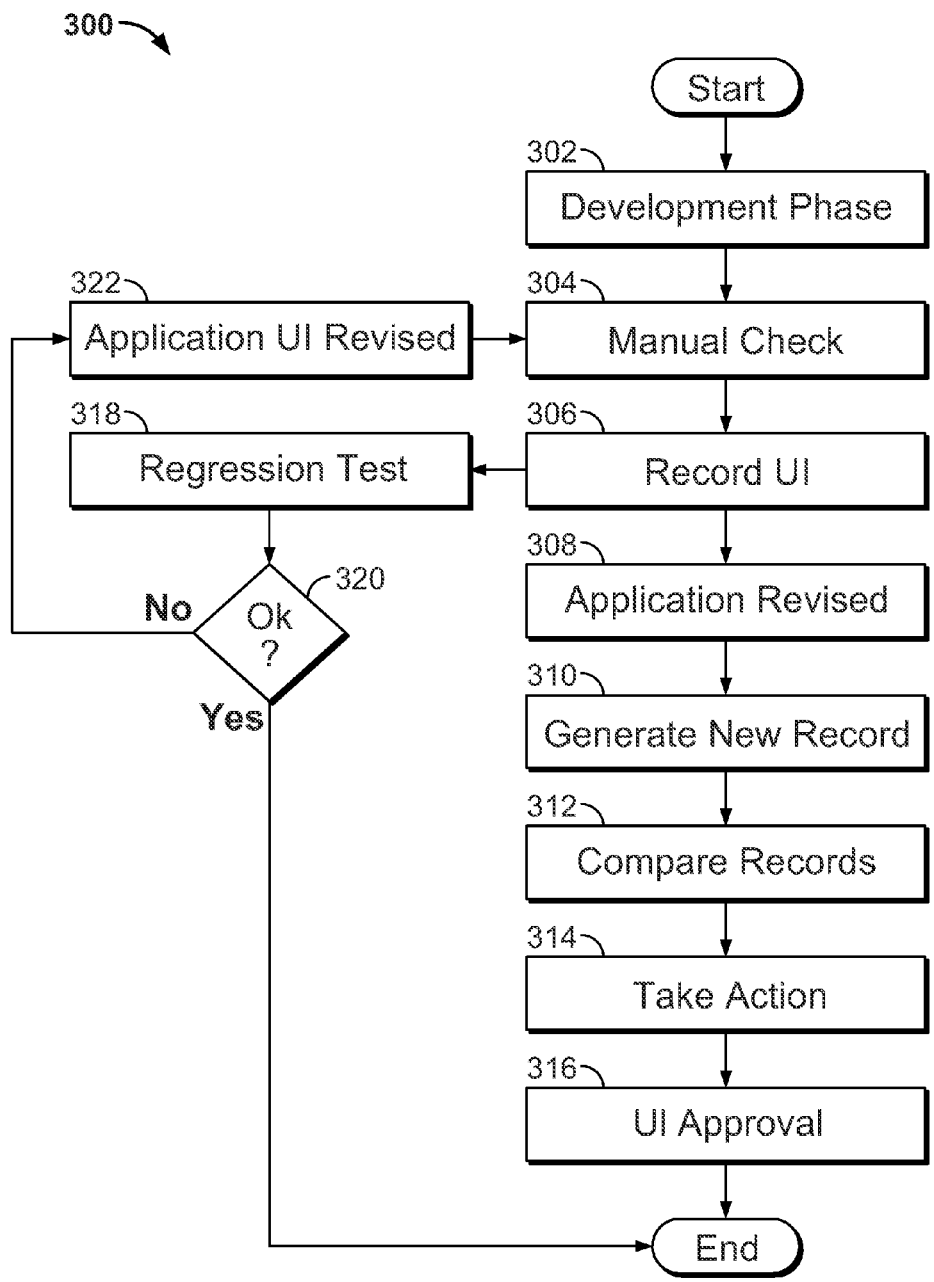
FIG. 3 shows an example method for testing a UI.

FIG. 3 shows an example method 300 for testing a UI. The method can be implemented for performance in a system, such as, but not limited to, the system 102 (FIG. 1). At stage 302 a development phase is initiated. For example, this can include one or more developers writing code for, or otherwise working on, an application or other program being created. The stage 302 can end at a predefined time (e.g., at the close of development.) After the development, stage 304 can be performed in which the UI of the application is manually checked. In some implementations, a human can ascertain that the UI has the correct (intended) layout, the correct UI elements, and that the text for each UI element is correct. For example, this can in part involve performing a language acceptance test on the UI. If the UI passes the test(s), a stage 306 can be performed where the UI is recorded. For example, a markup-language record corresponding to the UI can be generated.

A stage 308 can take place next, in which the application undergoes one or more revisions. In some implementations, this can occur in a phase after development closes but before the software is shipped to a customer. For example, a period of error-correction and minor modifications can take place.

After the application is revised, a new record can be generated in stage 310. For example, this can be a markup-language record that is generated analogously to the way the UI was recorded in the stage 306. At a stage 312, the generated records are compared. For example, the comparison can determine whether the layout, UI elements or element texts reflected in one record correspond to those reflected in the other.

Based on the outcome of the comparison, one or more actions are taken in a stage 314. For example, the application can be flagged for manual checking, such as to correct a non- or mis-translated term. On the other hand, if the comparison does not identify any issues (e.g., if the UI has not changed in any relevant way since the previous recording) then the system can automatically make a note that the UI is still correct and does not need any manual activities. When the UI has passed the necessary tests and is acceptable, the UI can be approved in a stage 316. For example, this clearing can be necessary before customer shipment is authorized.

In some implementations, the recorded UI can be checked with an automatically executed regression test. For example, this can be done using a test management system. Such an automated regression test can provide information about a corrected or otherwise changed UI.

In the method 300, stage 308 where the UI is recorded can be followed by a stage 318 where a regression test is performed. At 320, it is determined whether the UI passed the regression test. For example, if an error is detected, the UI might be different as a side effect of some correction of the software, which is indirectly linked to the UI. The UI must then be corrected so that the test returns no error. If the UI does not pass the regression test, one or more actions can be taken at a stage 322. For example, the UI can be revised to address one or more problems. Thereafter, a manual check can be performed at 304. If the correction results in a valid change in the UI, then the recorded UI can be updated accordingly. This can happen, for example, when adapting addresses, which are used in many UIs. On the other hand, if the UI passes the regression test, the method 300 can end.

Figure 4:
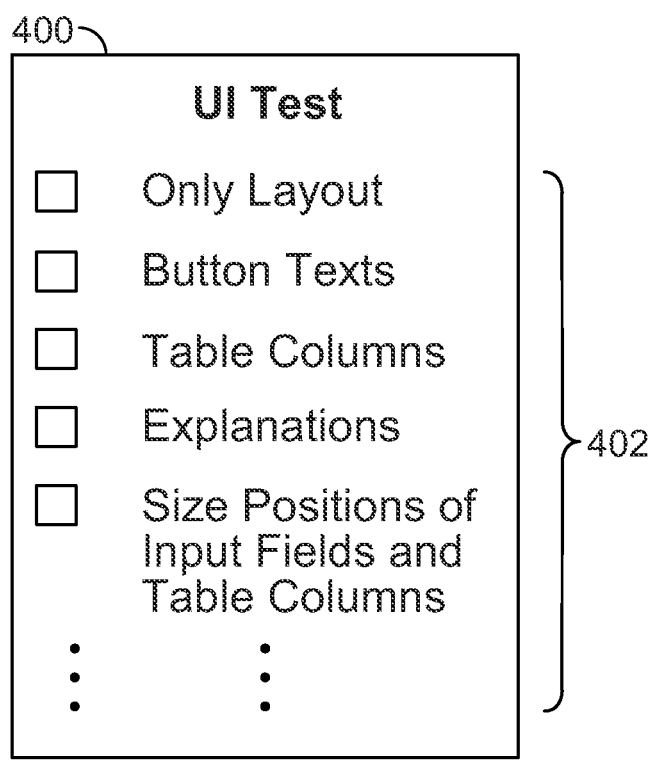
FIG. 4 shows a menu that presents multiple aspects for testing a UI.

FIG. 4 shows a menu 400 that presents multiple aspects for testing a UI. In some implementations, there is a choice between two or more options or alternatives when testing a UI. For example, and without limitation, the following automated check can be performed for English UIs:

| English labels |
| --- |
| Static texts |
| Primary help |
| Correct layout |
| Correct alignment of labels |
| Correct alignment of input fields |
| Correct position and size of UI elements |

For this and other purposes, the menu 400 can be presented—e.g., in the interface of a test tool—to offer the ability to choose among different aspects for testing a UI. The menu 400 here includes user-selectable choices 402 which can correspond to testing only the UI layout, testing button texts, testing table columns, testing explanations, and/or testing the size/position of input fields and table columns, to name just a few examples. For example, if the button text option is selected, it can be tested whether the text "Order" is correct for the current UI. As other examples, for table columns "Item Type" or "Process Type" can be tested, and for explanations, one can test "To select a product from a catalog . . . ."

One or more of the choices 402 can be selected. For example, the selection made using the menu 400 can influence how the comparison 118 (FIGS. 1C-F) is performed.

Figure 5:
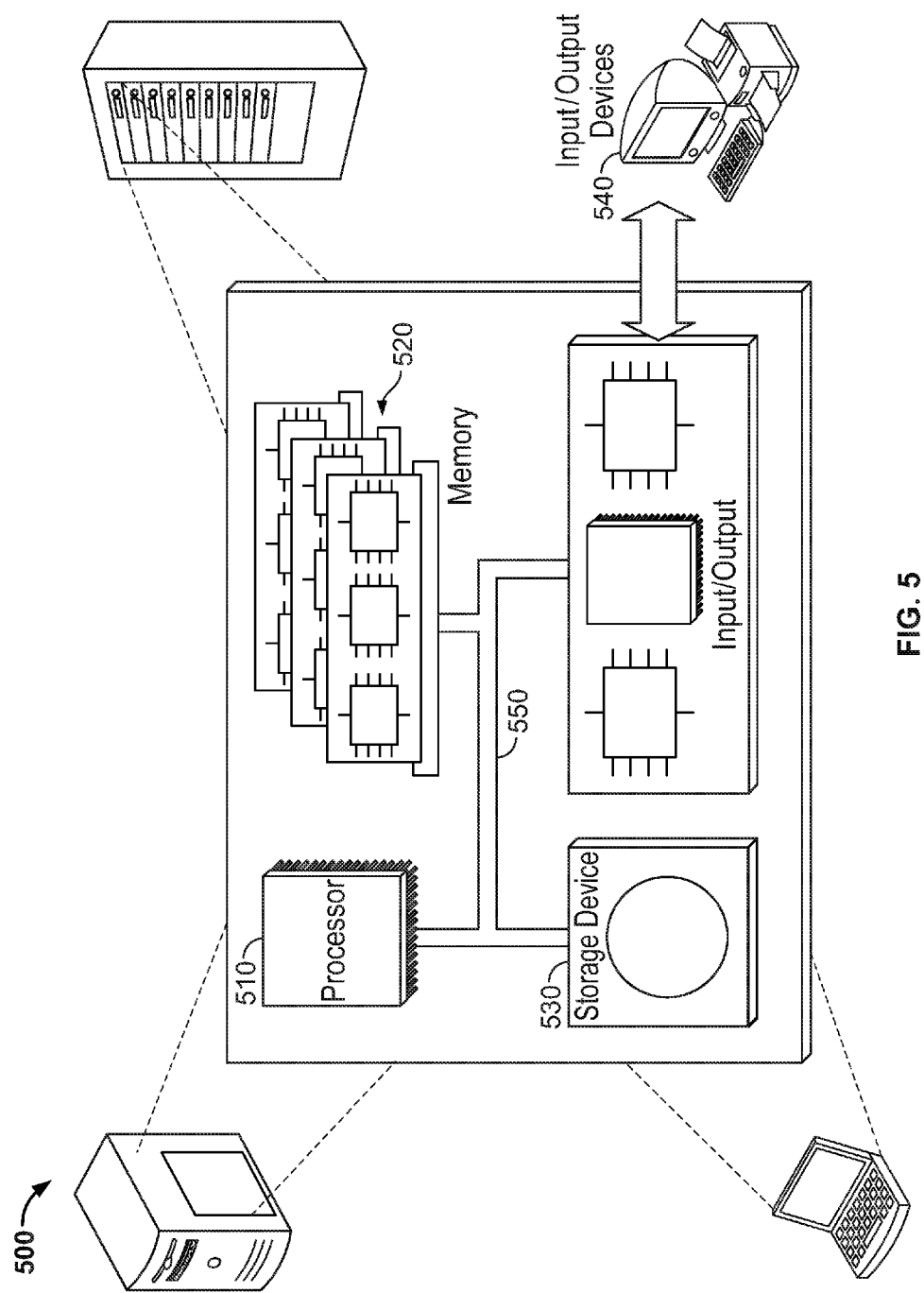
FIG. 5 is a block diagram of a computing system that can be used in connection with computer-implemented methods described in this document.

FIG. 5 is a schematic diagram of a generic computer system 500. The system 500 can be used for the operations described in association with any of the computer-implement methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. The memory 520 is a volatile memory unit in some implementations and is a non-volatile memory unit in other implementations.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method for testing a user interface, the method comprising:

receiving, in a computer system, a first manual check result from user performance of a first manual check of a user interface of an application;

generating, by the computer system, a first markup-language record from the user interface and associating the first markup-language record with the first manual check result;

detecting, by the computer system, that a user logged into the computer system using a different human language than the human language the computer system used for the user interface when the first markup-language record was generated;

generating, automatically without user intervention by the computing system in response to the computer system detecting that the user logged into the computer system using the different human language and in response to determining that at least one change has been made in the application after the generation of the first markup-language record, a second markup-language record from the user interface, wherein the change was made in the application after the user performance of the first manual check of the user interface, and wherein the second markup-language record is associated with the different human language;

comparing, by the computer system, the first markup-language record with the second markup-language record to determine whether the user interface passes a language acceptance test; and determining, by the computer system, that the user interface failed the language acceptance test as a result of:
 (i) determining that user-interface element text in the first markup-language record is identical to a corresponding user-interface element text in the second markup-language record, and
 (ii) determining that the user-interface element text in the first markup-language record is not on an exceptions list; and performing, in the computer system, an action to flag that the user interface failed the language acceptance test as a result of having determined that the user interface failed the language acceptance test.

2. The computer-implemented method of claim 1, wherein the computing system is configured to associate the second markup-language record with the first manual check result as a result of a determination that the user interface passed the language acceptance test.

3. The computer-implemented method of claim 1, further comprising performing a layout check, wherein the computer system is configured to determine that the user interface passed the layout check as a result of a first layout reflected by the first markup-language record corresponding to a second layout reflected by the second markup-language record.

4. The computer-implemented method of claim 1, wherein the computing system is configured to determine that the user interface failed the language acceptance test as a result of the user-interface element text in the first markup-language record having no corresponding user-interface element text in the second markup-language record.

5. The computer-implemented method of claim 1, further comprising receiving a user input that selects at least one of multiple aspects for a test of the user interface, wherein the test comprises the selected at least one aspect based on the received user input.

6. A computer program product embodied in a non-transitory computer-readable storage medium and comprising instructions that when executed by a processor perform a method for testing a user interface, the method comprising:
 receiving, in a computer system, a first manual check result from user performance of a first manual check of a user interface of an application;
 generating, by the computer system, a first markup-language record from the user interface and associating the first markup-language record with the first manual check result;
 detecting, by the computer system, that a user logged into the computer system using a different human language than the human language the computer system used for the user interface when the first markup-language record was generated;
 generating, automatically without user intervention by the computing system in response to the computer system detecting that the user logged into the computer system using the different human language and in response to determining that at least one change has been made in the application after the generation of the first markup-language record, a second markup-language record from the user interface, wherein the change was made in the application after the user performance of the first manual check of the user interface, and wherein the second markup-language record is associated with the different human language;
 comparing, by the computer system, the first markup-language record with the second markup-language record to determine whether the user interface passes a language acceptance test; and
 determining, by the computer system, that the user interface failed the language acceptance test as a result of:
  (i) determining that user-interface element text in the first markup-language record is identical to a corresponding user-interface element text in the second markup-language record, and
  (ii) determining that the user-interface element text in the first markup-language record is not on an exceptions list; and
 performing, in the computer system, an action to flag that the user interface failed the language acceptance test as a result of having determined that the user interface failed the language acceptance test.

7. The computer program product of claim 6, wherein the computing system is configured to associate the second markup-language record with the first manual check result as a result of a determination that the user interface passed the language acceptance test.

8. The computer program product of claim 6, wherein the method further comprising performing a layout check, wherein the computer system is configured to determine that the user interface passed the layout check as a result of a first layout reflected by the first markup-language record corresponding to a second layout reflected by the second markup-language record.

9. The computer program product of claim 6, wherein the computing system is configured to determine that the user interface failed the language acceptance test as a result of the user-interface element text in the first markup-language record having no corresponding user-interface element text in the second markup-language record.

10. The computer program product of claim 6, the method further comprising receiving a user input that selects at least one of multiple aspects for a test of the user interface, wherein the test comprises the selected at least one aspect based on the received user input.

11. A system comprising:
 one or more processors; and
 a computer program product embodied in a non-transitory computer-readable storage medium and comprising instructions that when executed by a processor perform a method for testing a user interface, the method comprising:
  receiving, in a computer system, a first manual check result from user performance of a first manual check of a user interface of an application;
  generating, by the computer system, a first markup-language record from the user interface and associating the first markup-language record with the first manual check result;
  detecting, by the computer system, that a user logged into the computer system using a different human language than the human language the computer system used for the user interface when the first markup-language record was generated;
  generating, automatically without user intervention by the computing system in response to the computer system detecting that the user logged into the computer system using the different human language and in response to determining that at least one change has been made in the application after the generation of the first markup-language record, a second markup-language record from the user interface, wherein the change was made in the application after the user performance of the first manual check of the user interface, and wherein the second markup-language record is associated with the different human language;

comparing, by the computer system, the first markup-language record with the second markup-language record to determine whether the user interface passes a language acceptance test; and determining, by the computer system, that the user interface failed the language acceptance test as a result of:
  (i) determining that user-interface element text in the first markup-language record is identical to a corresponding user-interface element text in the second markup-language record, and
  (ii) determining that the user-interface element text in the first markup-language record is not on an exceptions list; and performing, in the computer system, an action to flag that the user interface failed the language acceptance test as a result of having determined that the user interface failed the language acceptance test.

12. The system of claim 11, wherein the computing system is configured to associate the second markup-language record with the first manual check result as a result of a determination that the user interface passed the language acceptance test.

13. The system of claim 11, wherein the method further comprises performing a layout check, wherein the computer system is configured to determine that the user interface passed the layout check as a result of a first layout reflected by the first markup-language record corresponding to a second layout reflected by the second markup-language record.

14. The system of claim 11, the method further comprising receiving a user input that selects at least one of multiple aspects for a test of the user interface, wherein the test comprises the selected at least one aspect based on the received user input.

* * * * *